Patented Sept. 27, 1949

2,482,771

UNITED STATES PATENT OFFICE 2,482,771

METHOD OF COPOLYMERIZING VINYLIDENE CHLORIDE AND VINYL CHLORIDE

Jacob Heerema, Grand Rapids, Mich., assignor to The Dow Chemical Company, Midland, Mich., a corporation of Michigan No Drawing. Application July 15, 1944, Serial No. 545,185

1 Claim. (Cl. 260—87.5)

This invention relates to a method of forming interpolymers which are substantially homogeneous in their composition.

It is recognized that, with rare exceptions, the individually polymerizable ingredients of an interpolymerization mixture do not exhibit equal rates of reaction. The concentration of the slower reactant builds up gradually relative to the other monomer, as polymerization progresses. After a time, the monomeric composition changes so radically as to affect the composition of the interpolymer produced. Hence, the interpolymer formed toward the end of the reaction tends to be much richer in the slower reactant than that formed earlier, and correspondingly poorer in the more active material originally present. This is known to result in the production of interpolymers, individual portions of which differ widely in composition and physical properties from the average properties of the product. Such a result is undesirable in most fields in which interpolymers are used. Thus, for thermoplastic operations such as molding or extrusion, it is highly desirable to have homogeneous interpolymers for ease of controlling the properties of the finished product. Similarly, interpolymers for use in coating compositions should be as nearly homogeneous as possible for reasons which should be apparent. The production of practically homogeneous interpolymers is accordingly an important problem.

One proposed solution of the problem, applicable to emulsion polymerization, is described by Fikentscher in U. S. Patent No. 2,100,900. That patent suggests the controlled addition of the relatively high-speed polymerizable substance to the materials of slower reaction at about the rate at which the former enters into the reaction. Among the disadvantages of such a method, may be mentioned: (1) the requirement for special equipment to inject monomer against existing pressure in the reactor; (2) the increased hazard of introducing impurities into the reaction; and (3) the necessity of injecting much larger quantities of the speedier material than of the one in the reaction vessel when it is desired to form an interpolymer rich in the speedier reactant. These disadvantages are especially noticeable when the "bulk" or the "suspension" methods of interpolymerization are employed, instead of the emulsion method.

It is an object of the present invention to provide a method for the interpolymerization of two or more polymerizable, unsaturated organic compounds, whereby a product of substantially homogeneous composition may be obtained. A related object is to provide such a method which is applicable to the common situation in which one member of a system of interpolymerizable reactants reacts more rapidly than the rest of the system. It is a particular object to provide such a method whereby a substantially homogeneous interpolymer of vinylidene chloride and vinyl chloride may be produced. Yet another object is to provide such a method which is applicable to the production of vinylidene chloride-vinyl chloride interpolymers of high vinylidene chloride content. Other and related objects will be apparent from the following description and the appended claim.

It has now been found, according to the present invention, that the foregoing and related objects may be attained in those cases in which the more volatile monomer has the slower polymerization rate, by a method comprising the initial mixing of the desired polymerizable unsaturated organic compounds, subjecting said mixture to conditions to induce interpolymerization at a predetermined temperature at which the system has an appreciable vapor pressure and, shortly after such reaction has started, but usually before it is 25 per cent complete, bleeding monomer vapor from the system during the reaction whenever necessary to maintain a substantially constant and usually superatmospheric pressure therein until substantial completion of the interpolymerization is obtained, as indicated by an abrupt and spontaneous decrease in the internal pressure in the reaction vessel.

To illustrate, experience has shown that vinylidene chloride polymerizes more rapidly than vinyl chloride in most mixtures of these interpolymerizable substances. It is known that vinyl chloride is the more volatile of these two substances. When the entire reaction mixture is confined in the reaction vessel throughout polymerization, the vapor pressure increases as the residual monomeric mixture becomes progressively richer in vinyl chloride and the polymeric composition changes progressively, also becoming richer in vinyl chloride, towards the end of the reaction. When, however, the vapor pressure is prevented from rising above a selected value by bleeding off monomer vapor during the polymerization, in accordance with this invention, it has been found that the interpolymer formed throughout the reaction period, under any given set of conditions of temperature and initial proportions of reactants, is of substantially homogeneous composition.

Monomer vapor should not be bled from the system until thermal equilibrium has been reached. By this is meant the attainment of a constant temperature in the reaction mixture, and resulting equilibrium between the vapor and liquid phases present. Such regulation of the temperature as may be necessary may be accomplished by mechanical controls, designed to balance the heat gains and losses in the system. This may require a few minutes or a few hours, depending on the size of the batch and the rate and control of heat input. In the vinylidene chloride-vinyl chloride system, no great change in monomer ratio occurs in the vapor until the polymerization is almost 50 per cent complete, and little monomer is recovered even when the vent is opened before this stage is reached.

The following examples will illustrate the practice of the invention with respect to the interpolymerization of vinylidene chloride and vinyl chloride.

*Example I.*—61 pounds (78 per cent) of monomeric vinylidene chloride and 17½ pounds (22 per cent) of monomeric vinyl chloride were charged into a glass-lined reaction vessel having a net volume of 67 gallons. There was added 175 pounds of water and approximately 3 ounces of benzoyl peroxide, as a catalyst. The vessel was sealed and the contents were agitated while the temperature was increased to 60° C. Temperature control throughout the reaction restricted fluctuations to less than 0.5°. One hour was required to bring the charge to reaction temperature. The pressure on the system was 60 pounds per square inch gauge. When the pressure tended to rise above this value, due to the progress of the interpolymerization reaction, a relief valve was opened to bleed off monomer vapor just sufficiently to prevent the 60 pound pressure on the reaction vessel from being exceeded. Escaping monomer was chilled, condensed, and caught for purposes of measurement and analysis. At the end of 32 hours monomer evolution had ceased and the pressure on the reaction vessel dropped abruptly within the next two hours, to about 40 pounds per square inch. This was taken as an indication that the reaction had progressed substantially to completion. The remaining vapor over the reaction mass was withdrawn from the vessel by suction and the product in the reaction vessel was separated from water and remaining liquid monomer. There was recovered 57.6 pounds of an interpolymer and 16.8 pounds of mixed monomer. Analysis showed the interpolymer to be composed of 9.2 per cent vinyl chloride and correspondingly 90.8 per cent of vinylidene chloride. The product was nearly homogeneous in composition, as is evidenced by the fact that only 0.39 per cent was soluble in, or extractable by acetone.

By way of contrast, a batch of the same reagents, in approximately the same proportion, was heated in the same reaction vessel at 60° C. for an equivalent period of time. The vessel was sealed throughout the reaction, in line with heretofore standard procedure. The solid interpolymer produced represented approximately the same yield as when operating in accordance with the present invention, but 5.93 per cent of the product recovered was soluble in acetone and 11.8 per cent of a representative sample of the interpolymer was vinyl chloride, while only 88.2 per cent was vinylidene chloride. Another comparison between the products of these two reaction methods may be found in the time required for a test specimen of the normally crystallizable polymer to exhibit crystallization under standard conditions. The product which had been made in accordance with this invention, when fused and chilled in accordance with the procedure described by Wiley in U. S. 2,183,602, crystallized from the supercooled state within 45 seconds, while the sample produced in accordance with the other described method required 200 seconds for crystallization. This is an indication of non-homogeneity and of the existence, in the heretofore standard product, of foreign materials (probably mixed polymers) tending to inhibit the normal crystallization reaction.

*Example II.*—In a manner similar to that set forth in the preceding example, a mixture of 70 per cent by weight of vinylidene chloride and 30 per cent of vinyl chloride was heated to 50° C., with stirring, in the presence of twice its weight of water and of 0.5 per cent of its weight of benzoyl peroxide. Thermal equilibrium had been reached and polymer formation was well started after 8 hours but was estimated to be only about 20 per cent complete, and thereafter the pressure on the system was held constant at 80 pounds per square inch gauge, by the controlled venting of excess vinyl chloride monomer to a recovery system. When the pressure dropped, reaction was deemed substantially complete, and the interpolymer was recovered. The product had a softening point of 115° C., a melting point of 131° C., and contained 20.2 per cent of vinyl chloride.

A control run, made at the same temperature and with the same proportion of reagents, but in a sealed vessel, attained a maximum pressure during the reaction of 86 pounds per square inch, and gave a somewhat higher yield, but of a poorer product than the run made in accordance with the present invention. The interpolymer contained 29.6 per cent vinyl chloride, softened at 112° C., melted at 126° C., and contained over 3 times as much acetone-soluble material as the interpolymer described in the preceding paragraph of this example. The acetone extract was rich in vinyl chloride.

In each of the pairs of runs reported in the above examples, all conditions save those specifically recited as differing, were kept as nearly identical as possible, so that the quality of interpolymer is seen to be dependent on the concentration of vinyl chloride left in the system during the reaction. In each case, a better product was obtained when operating in accordance with the present invention.

The results obtained are similar to those here reported when using mixtures originally containing from 50 to 90 per cent of vinylidene chloride and correspondingly from 50 to 10 per cent of vinyl chloride monomers. The operating procedure is not limited, however, to such proportions or to these particular monomers.

The invention has been illustrated with respect to the formation of an interpolymer of vinylidene chloride and vinyl chloride in aqueous suspension. It is equally applicable to the preparation of uniform products from these polymerizable substances by the mass or bulk polymerization method. The invention applies as well to the formation of uniform interpolymers from numerous other pairs or groups of two or more interpolymerizable materials in which the more volatile has the slower rate of polymerization. Thus, we may substitute in the foregoing examples, pairs of such monomers as vinyl acetate, vinyl cyanide, methyl acrylate, methyl methacrylate, iso-butylene, butadiene, acrylic acid, or any of numerous other polymerizable substances, so as to provide a system wherein the less reactive monomer is the more volatile, and will find that, the advantages which have been shown in the above examples will apply as well in such other cases. When vinylidene chloride is one of the monomers being subjected to interpolymerization, it is found that vinyl chloride, butadiene and iso-butylene are more volatile but less reactive.

The invention is not limited to operation for the periods of time or at the temperatures and pressures which have been given in the examples. The temperature to be used in any particular case, as well as the selection of the appropriate catalyst, are matters which may be determined from the disclosures in the prior art. It is generally preferable to operate at temperatures above room temperature in order to speed up the reaction somewhat, but it is believed to be well understood that an upper practical limit of polymerization temperatures exists, beyond which, for most purposes, the properties of the product obtained are deemed unsatisfactory. In describing the invention, it is believed sufficient to state that it has been found possible to obtain an interpolymer of improved homogeneity by removing the excess of the more volatile and slower polymerizing monomer from the reaction vessel, after thermal equilibrium is reached, in such a manner as to prevent the internal pressure from exceeding a preselected value which will generally be the pressure of the original mixture of monomers at the selected temperature.. It is to be understood, of course, that such monomer removal is always accompanied by a withdrawal from the system of certain amounts of the monomer of the speedier reacting substance. Such loss is relatively insignificant and the advantages to be gained by the herein described procedure more than offset any temporary disadvantages inherent in that loss, since the recovered monomers, with proper additions to provide the right composition, may be used in the initial charge in subsequent batches.

I claim:

A method which comprises subjecting an agitated aqueous suspension of a mixture of from 50 to 90 per cent of vinylidene chloride monomer, and correspondingly from 50 to 10 per cent of vinyl chloride monomer, by weight, to interpolymerizing conditions in a closed system at a constant temperature at which the system has a substantial vapor pressure, and bleeding monomer vapor rich in vinyl chloride from the system during the polymerization reaction, just sufficiently to prevent the pressure therein from exceeding a value corresponding to that of the selected mixture of monomers at the said constant temperature, until the internal pressure in the system spontaneously decreases.

JACOB HEEREMA.

REFERENCES CITED

The following references are of record in the file of this patent:

UNITED STATES PATENTS

| Number | Name | Date |
|---|---|---|
| 2,100,900 | Fikentscher | Nov. 30, 1937 |
| 2,160,931 | Wiley | June 6, 1939 |
| 2,420,330 | Shriver et al. | May 13, 1947 |

Certificate of Correction

September 27, 1949

Patent No. 2,482,771

JACOB HEEREMA

It is hereby certified that errors appear in the above numbered patent requiring correction as follows:

In the grant, line 3, and in the heading to the printed specification, line 6, State of incorporation, for "Michigan" read *Delaware*; and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*